(12) United States Patent
Mizuta et al.

(10) Patent No.: US 6,437,264 B1
(45) Date of Patent: Aug. 20, 2002

(54) STRUCTURE FOR MOUNTING STOKE SWITCHES

(75) Inventors: Ken Mizuta; Hironori Kato; Toshiyuki Hoshi; Yoshio Sanpei, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/575,031

(22) Filed: May 19, 2000

(30) Foreign Application Priority Data

May 20, 1999 (JP) .......................................... 11-140722

(51) Int. Cl.[7] .......................... H01H 9/00; H01H 25/00
(52) U.S. Cl. .................................................. 200/61.54
(58) Field of Search .......................... 200/61.54–61.57, 200/293–307, 61.27–61.38; 361/10.1–10.8

(56) References Cited

U.S. PATENT DOCUMENTS

| 4,277,658 A | * | 7/1981 | Delp et al. | 200/61.54 |
|---|---|---|---|---|
| 5,754,020 A | | 5/1998 | Urhahne | |
| 5,883,348 A | * | 3/1999 | Yokoyama | 200/61.54 |
| 5,895,899 A | * | 4/1999 | Sano | 200/61.54 |
| 5,990,571 A | | 11/1999 | Sato et al. | 307/10.1 |
| 6,147,315 A | * | 11/2000 | Rudolph et al. | 200/61.54 |

FOREIGN PATENT DOCUMENTS

| DE | 44 28 883 | 12/1995 |
|---|---|---|
| GB | 0 366 628 | 5/1999 |
| WO | WO 98/01318 | 1/1998 |

* cited by examiner

Primary Examiner—J. R. Scott
(74) Attorney, Agent, or Firm—Brinks Hofer Gilson & Lione

(57) ABSTRACT

It is an object to provide structure for mounting stoke switches, easy to be assembled, capable of exchangeably mounting stoke switches having the same function or different functions to a steering column to enable them to be exchanged. The first and second stoke switches have proximal portions capable of being mounted to a steering column by extracting and inserting, and operating levers extending from the proximal portions respectively, and there are provided connector units, which are made connectable to connector units provided on the lateral sides of the steering column in such a manner that when the first and second stoke switches are extracted from and inserted into the steering column, the connector units on the steering column side discriminate between the first and second stoke switches.

7 Claims, 5 Drawing Sheets

STRUCTURE FOR MOUNTING STOKE SWITCHES

BACKGROUND OF THE INVENTION

1. Field of the Invention

The present invention relates to structure for mounting steering wheel column lever type switches (hereinafter referred to as stoke switches) for vehicles such as automobiles, and more particularly to structure for mounting stoke switches capable of being mounted so as to enable them to be left-right exchanged.

2. Description of the Prior Art

Conventional structure for mounting stoke switches will be described. Although the illustration is omitted, on the lateral sides of a steering column, there are mounted stoke switches having different functions, which have operating levers for controlling operations of wipers, headlights, turn signals and the like.

The stoke switches are mounted to the steering column by screwing or the like, and the operating levers are adapted to be rockable.

In a vehicle such as an automobile having a steering column to which such stoke switches are mounted, the position of the steering wheel generally differs depending upon whether for Japanese domestic use or for export to Europe, America and the like. In the case of vehicles for Japanese domestic use, a right-steering wheel vehicle is used, and the steering wheel is mounted on the right side toward the traveling direction, while in the case of vehicles for Europe, America and the like, a left-steering wheel vehicle is used, and the steering wheel is mounted on the left side toward the traveling direction.

As regards a stoke switch to be mounted to a steering column having a function for, for example, a wiper operation, it is mounted on the left side of the steering column in the case of the right-steering wheel vehicle, while it is mounted on the right side of the steering column in the case of the left-steering wheel vehicle.

Even in a stoke switch having functions of headlights and turn signal switches, if there is a switch having another function to be added to these functions, the design has been newly performed from the beginning.

In the conventional structure for mounting stoke switches, however, even if an attempt is made to left-right exchange a stoke switch mounted on the left side of the steering column in, for example, a right-steering wheel vehicle for mounting it to the right side of the steering column in a left-steering wheel vehicle, it could not be performed because the left and right stoke switches have not been designed so as to be exchangeable. Accordingly, even if they are stoke switches having the same function, exclusively used stoke switches have had to be prepared respectively between the right-steering wheel vehicle for domestic use and the left-steering wheel vehicle for export to Europe, America and the like, and therefore, control has been a demanding task due to the increasing variety of stoke switches.

Also, even if a stoke switch is made left-right exchangeable and the stoke switch is left-right exchanged, there has been a problem that a function mark formed on the stoke switch, for indicating the function is turned upside down, and cannot be recognized.

Also, when a stoke switch having another function added is placed on an one-sided receiving portion for exchanging instead of left-right exchange, the design has had to be newly performed from the beginning and it has taken a lot of time and labor.

In addition, since the stoke switch has been mounted to the steering column by screwing or the like, the assembly was a demanding task.

SUMMARY OF THE INVENTION

It is an object of the present invention to provide structure for mounting stoke switches, easy to assemble, capable of exchangeably mounting a stoke switch having the same function to a steering column, and also exchangeably mounting a stoke switch having an added function although substantially the same in terms of function.

As means for solving the problem, the structure for mounting stoke switches according to the present invention is provided with a steering column and a plurality of stoke switches having different functions, mounted to this steering column to enable them to be extracted and inserted, and each of these stoke switches having a proximal portion which is capable of being mounted to the steering column by extracting and inserting, and an operating lever extending from this proximal portion, and having different discrimination codes respectively, and the steering column has discrimination means capable of discriminating the discrimination codes in such a manner that this discrimination means is capable of discriminating the discrimination codes of the stoke switches to be mounted to the steering column.

Also, as means for solving the problem, the structure is arranged such that the plurality of stoke switches have the discrimination codes consisting of fixed resistors having different resistances respectively, and the discrimination means includes an arithmetic processing unit provided on the steering column side, and a reference resistor consisting of a predetermined resistance in such a manner that when the stoke switches are extracted from and inserted into the steering column for exchanging, the arithmetic processing unit is capable of detecting a ratio of a resistance of the reference resistor to a resistance of the fixed resistor of each of the stoke switches to cause the functions of the stoke switches to be performed respectively.

Also, as means for solving the problem, the structure is arranged such that each of the stoke switches has a mounting unit, in the operating lever, which is an indicating member, on which a function mark indicating the function of the stoke switch has been formed, can be attached to and detached from the operating lever, in such a manner that when the stoke switches are extracted from and inserted into the steering column for exchanging, the indicating member can be attached and detached to allow the direction of the function mark to b e corrected.

Also, as means for solving the problem, the structure is arranged such that the indicating member is capable of being mounted to the mounting unit of the operating lever by snap engagement in accordance with the function of the stoke switch.

Also, as means for solving the problem, the structure is arranged such that the operating lever is mounted to the proximal portion in such a manner that the center line of the operating lever in the extending direction from the proximal portion becomes substantially horizontal, the operating lever has a function mark for indicating the function of the stoke switch, and the function mark is formed with the direction thereof inclined in the center line direction of the operating lever.

Also, as means for solving the problem, the stoke switch is constructed such that the operating lever is detachably mounted to the proximal portion, that the operating lever has a function mark for indicating the function of the stoke switch, that there are provided two types (right-hand and left-hand) for each of the operating levers having the same function, and that when the stoke switches are left-right exchanged and are mounted to the lateral sides of the steering column, any appropriate ones of the operating levers are exchanged correspondingly to the respective mounting directions of the stoke switches.

Also, as means for solving the problem, each of the stoke switches is constructed such that the operating lever is formed by bending it in an irregular shape.

Also, as means for solving the problem, the stoke switch is constructed such that the steering column has a mounting unit capable of snap-engaging with the proximal portion of the stoke switch within, and the proximal portion of each of the stoke switches is mounted to the mounting member by snap engagement.

Also, as means for solving the problem, the structure is arranged such that there are provided a steering column, and first and second stoke switches mounted to this steering column on the lateral sides thereof to enable them to be extracted and inserted, having a switching circuit within respectively, each of these stoke switches having a proximal portion capable of being mounted to the steering column by extracting and inserting, and an operating lever extending from the proximal portion, each of the stoke switches being provided with a connector unit, which is made connectable to each of connector units provided on the lateral sides of the steering column, the connector unit of the first stoke switch having a first connecting unit, and the connector unit of the second stoke switch having a second connecting unit, in such a manner that when the first and second stoke switches are extracted from and inserted into the steering column, the first and second connecting units are connected to the connector units on the lateral sides of the steering column respectively and discrimination between the first and second stoke switch is performed.

Also, as means for solving the problem, the structure is arranged such that the connector units on the lateral sides of the steering column have first and second conduction units, to which the first and second connecting units can be connected respectively, and when the first and second stoke switches are inserted into the lateral sides of the steering column respectively, the first connecting unit of the first stoke switch is connected to the first conduction unit of the steering column while the second connecting unit of the second stoke switch is connected to the second conduction unit in such a manner that discrimination between the first and second stoke switches is performed.

DETAILED DESCRIPTION OF THE PREFERRED EMBODIMENTS

Embodiments of the Invention

Figure 1:
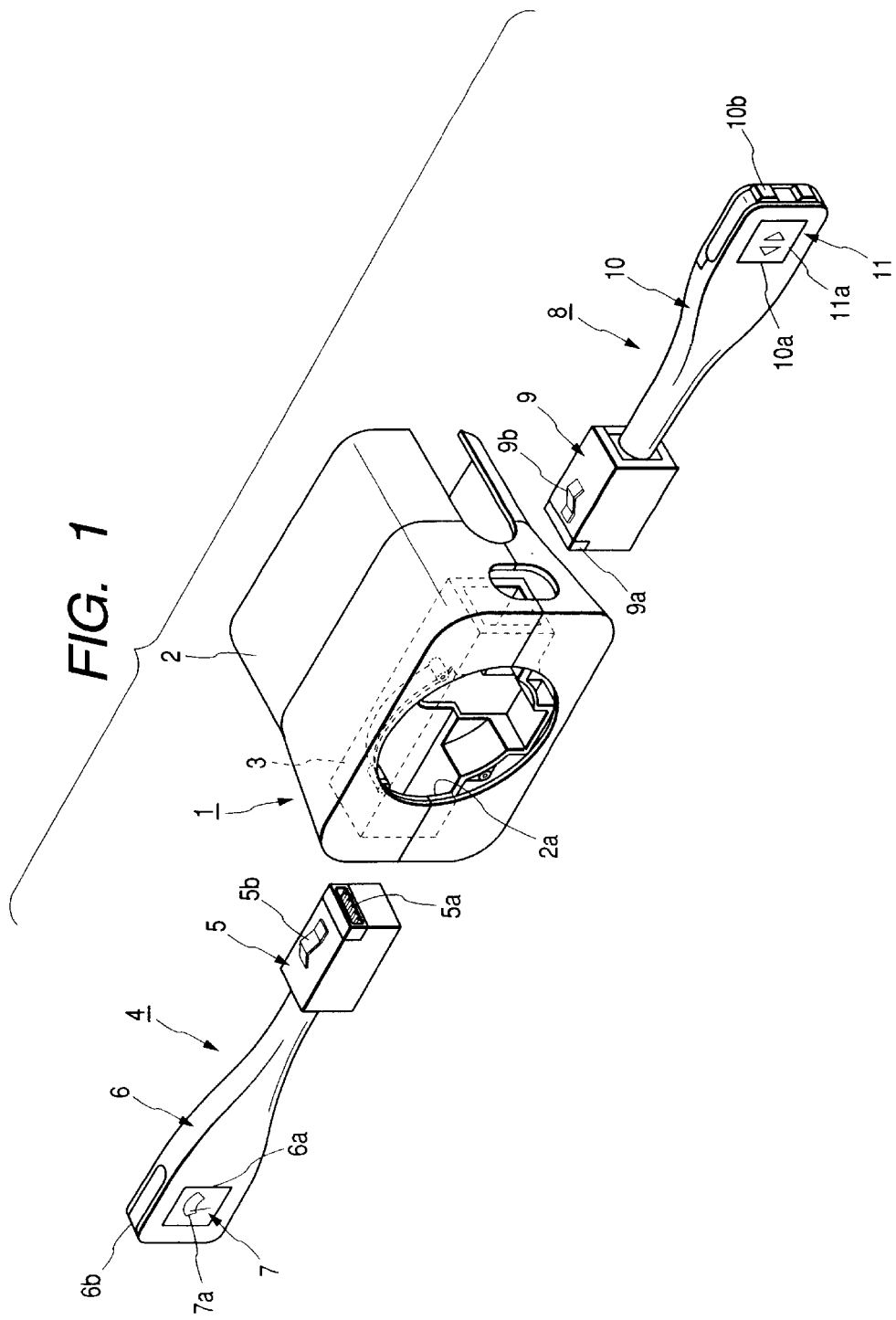
FIG. 1 is an exploded perspective view concerning the present invention.
Figure 6:
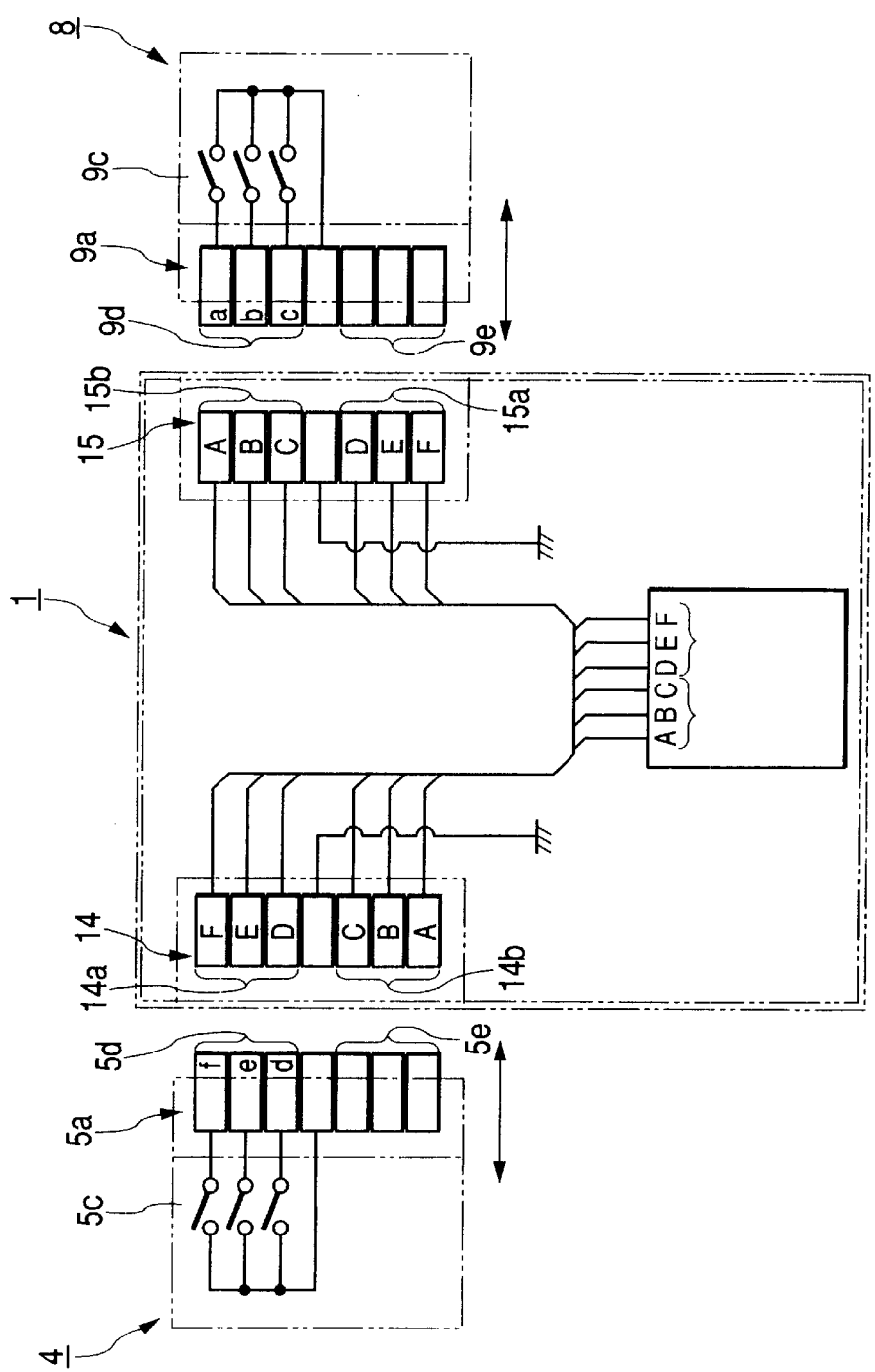
FIG. 6 is a schematic circuit diagram showing connection between a connector unit of a stoke switch and a connector unit of a steering column according to the present invention.
Figure 7:
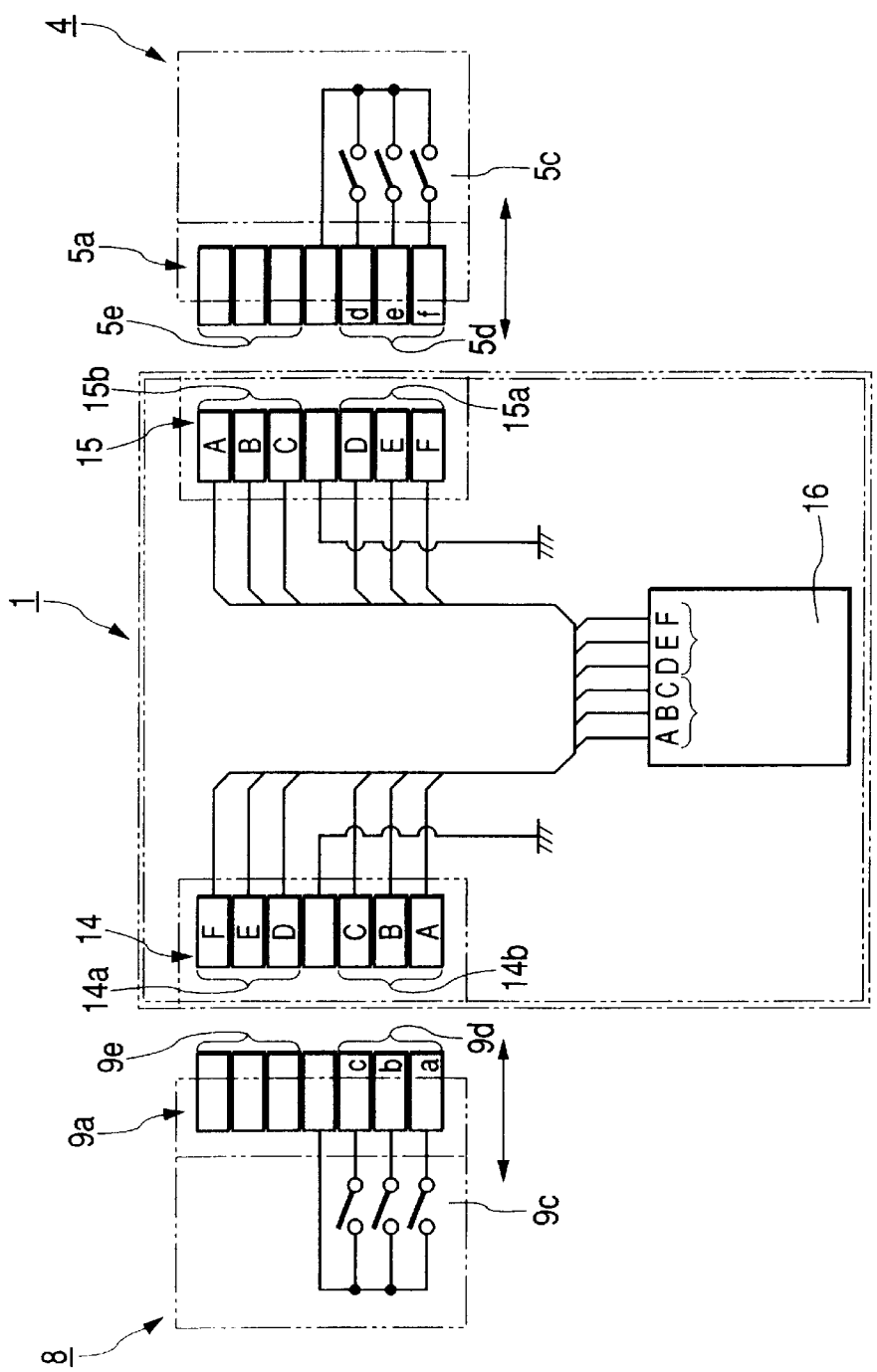
FIG. 7 is a schematic circuit diagram showing connection between a connector unit of a stoke switch and a connector unit of a steering column according to the present invention.

Hereinafter, with reference to the drawings, the description will be made of structure for mounting stoke switches according to a first embodiment of the present invention. FIG. 1 is an exploded perspective view concerning the present invention, FIGS. 2 to 5 are perspective views showing a stoke switch according to the present invention, and FIGS. 6 and 7 are schematic circuit diagrams showing the connection between a connector unit of a stoke switch and a connector unit of a steering column according to the present invention.

First, with reference to FIGS. 1 to 7, a description will be made of the structure for mounting stoke switches according to the first embodiment of the present invention. As regards the structure for mounting stoke switches according to the present invention, as shown in FIG. 1, there is arranged a steering column 1 mounted to a steering shaft (not shown), which is a portion of a vehicle main body mounted with a steering wheel (not shown) and the like.

The steering column 1 has a cover 2 which can be divided into two upper and lower portions, and within the cover 2, there is arranged a mounting member 3, to which first and second stoke switches 4 and 8 to be described later can be mounted to enable them to be extracted and inserted.

At the front of the steering column 1, there is formed a hole 2a into which the steering shaft (not shown) is inserted.

On the lateral sides of the steering column 1, first and second stoke switches 4 and 8 having different functions are adapted to be mounted to a mounting member 3 within to enable them to be extracted and inserted.

In the case of a right-steering wheel vehicle for domestic use in which the steering wheel is mounted, for example, on the right side toward the traveling direction, the first stoke switch 4 capable of a wiper (not shown) operation is adapted to be mounted on the left side in FIG. 1, and the second stoke switch 8 capable of a flashing operation of, for example, a direction indicator light (not shown) is adapted to be mounted on the right side shown.

The first stoke switch 4 is constructed of a proximal portion 5, which is box-shaped in outside shape and is hollow inside, and an operating lever 6 for extending from the proximal portion 5. The proximal portion 5 on the side to be inserted into the steering column 1 is mounted with a connector unit 5a having a plurality of pin terminals.

Also, on the upper and lower outer walls of the proximal portion 5, there are mounted spring members 5b for mounting the proximal portion 5 to the mounting member 3 within the steering column 1 by snap engagement. In the hollow interior of the proximal portion 5, there is mounted a holder member (not shown) for rockably supporting the operating lever 6, a switch (not shown) operable by rocking of the operating lever 6 or the like.

Near the left end, at the front shown, of the operating lever 6 mounted to the proximal portion 5, there is formed a rectangular hole-shaped mounting unit 6a, to which an indicating member 7 having a function mark 7a for indicating the function of, for example, the wiper operation or the like can be detachably mounted.

At the left end shown of the operating lever 6, there is mounted an operating switch 6a constructed of, for example, a push switch capable of an urging operation or a slide switch capable of a sliding operation and the like. Within the first stoke switch 4, there are formed such a plurality of switching circuits 5c as shown in FIG. 6, constructed of an operating switch 6a, a switch (not shown) operable by rocking or the like of the operating lever 6 and the like.

On the right side of the steering column 1 shown in FIG. 1, the second stoke switch 8 having a different function from the first stoke switch 4 is adapted to be mounted to the mounting member 3 to enable it to be extracted and inserted.

This second stoke switch 8 is capable of, for example, a flashing operation of a direction indicator light (not shown), and a proximal portion 9 is adapted to be mounted to the mounting member 3 to enable it to be extracted and inserted as in the case of the first stoke switch 4.

The second stoke switch 8 is formed in the same external appearance as the first stoke switch 4, and the proximal portion 9 is mounted with a connector unit 9a and a spring member 9b. In an operating lever 10, an indicating member 11 having a function mark 11a for indicating a function of a flashing operation of a direction indicator light (not shown) is detachably mounted to a mounting unit 10a.

At the right end shown of the operating lever 10, there is mounted an operating switch 10b, and such a plurality of switching circuits 9c as shown in FIG. 6 are formed within.

Such first and second stoke switches 4 and 8 having respectively different functions as described above are mounted to the mounting member 3 within the steering column 1 to enable them to be extracted and inserted with the proximal portions 5 and 9 being snap-engaged through spring members 5b and 9b.

Since the first and second stoke switches 4 and 8 which can be extracted and inserted have been designed so as to be left-right exchangeable with respect to the steering column 1, for example, the first and second stoke switches 4 and 8 mounted to a right-steering wheel vehicle for domestic use can be mounted to a left- steering wheel vehicle for export to Europe and America by left-right exchanging.

When the first and second stoke switches 4 and 8 mounted to, for example, a right-steering wheel vehicle are mounted to a left-steering wheel vehicle by left-right exchanging, a description will be made of the first embodiment according to the present invention, in which the respective first and second stoke switches 4 and 8 can be discriminated.

On the respective stoke switches 4 and 8, there are provided connector units 5a and 9a having a plurality of pin terminals respectively. These connector units 5a and 9a are adapted to be connectable to connector units 14 and 15, each of which is constructed of a plurality of sockets shown in FIG. 6, provided on the lateral sides of the steering column 1 when the first and second stoke switches 4 and 8 are mounted to the mounting member 3 by extracting and inserting in a state in which they are opposed to each other on the lateral sides of the steering column 1.

As shown in FIG. 6, the connector unit 5a in the first stoke switch 4 is partitioned into a first connecting unit 5d consisting of pin terminals d, e and f connected to a switching circuit 5c within the first stoke switch 4, and a first dummy unit 5e consisting of pin terminals in a state not electrically connected to the switching circuit 5c.

A connector unit 9a of the second stoke switch 8 is formed to oppose to the connector unit 5a of the first stoke switch 4, and this connector unit 9a has a second connecting unit 9d consisting of pin terminals a, b and c connected to a switching circuit 9c within the second stoke switch 8 in a position opposed to the first connecting unit 5d, and a second dummy unit 9e consisting of pin terminals in a state not electrically connected to the switching circuit 9c in a position opposed to the first dummy unit 5e. In this manner, the first and second stoke switches 4 and 8 are constructed respectively.

A connector unit 14 arranged on the left side of the steering column 1 is formed such that it is partitioned into a first conduction unit 14a consisting of sockets D, E and F, and a second conduction unit 14b consisting of sockets A, B and C respectively.

A connector unit 15 arranged on the right side of the steering column 1 is formed such that it is partitioned into a second conduction unit 15b consisting of sockets A, B and C in a position opposed to the first conduction unit 14a, and a first conduction unit 14b consisting of sockets D, E and F in a position opposed to the second conduction unit 14b respectively.

In other words, the connector units 14 and 15 on the lateral sides of the steering column 1 are constructed to have the first and second conduction units 14a, 14b, 15a and 15b which are capable of being connected to the first and second connecting units 5d and 9d of the stoke switches 4 and 8 respectively.

When the first stoke switch 4 is inserted into the left-side connector unit 14 shown in FIG. 6, the first connecting unit 5d is adapted to be connected to the first conduction unit 14a, and when the second stoke switch 8 is inserted into the right-side connector unit 15 shown in FIG. 6, the second connecting unit 9d is adapted to be connected to the second conduction unit 15b.

When the first and second stoke switches 4 and 8 mounted to the lateral sides of the steering column 1 as shown in FIG. 6 are left-right exchanged as shown in FIG. 7, and the first stoke switch 4 is inserted into the right-side connector unit 15 as shown and the second stoke switch 8 is inserted into the left-side connector unit 14 as shown, then the first connecting unit 5d is adapted to be connected to the first conduction unit 15a, and the second connecting unit 9d is adapted to be connected to the second conduction unit 15b.

In other words, when the first and second stoke switches 4 and 8 are exchanged respectively and are inserted into the lateral sides of the steering column 1, the first connecting unit 5d of the first stoke switch 4 is connected to the first conduction unit 14a of the steering column 1, and the second connecting unit 9d of the second stoke switch 8 is connected to the second conduction unit 15b in such a manner that discrimination between the first and second stoke switches 4 and 8 can be performed by the respective connector units 14 and 15 of the steering column 1.

In the present invention, the description has been made of the example in which the connector units 5a and 9a of the first and second stoke switches 4 and 8 consist of a plurality of pin terminals and the connector units 14 and 15 on the steering column 1 side consist of a plurality of sockets, but it is possible to construct such that the connector units 5a and 9a of the first and second stoke switches 4 and 8 consist of a plurality of sockets and the connector units 14 and 15 on the steering column 1 side consist of a plurality of pin terminals.

According to the present invention, the first and second (plural) stoke switches 4 and 8 to be inserted into the lateral sides of the steering column 1 can be discriminated by the connector units 14 and 15 on the steering column 1 side as described above. Therefore, when first and second stoke switches 4 and 8 mounted to a right-steering wheel vehicle for domestic use are extracted respectively and are left-right exchanged to be mounted to a left-steering wheel vehicle for export to Europe and America, the first and second stoke switches 4 and 8 can be discriminated to thereby enable their respective functions to be performed.

For this reason, the first and second stoke switches 4 and 8 having different functions respectively do not need any left or right exclusive stoke switch, and the variety of the stoke switches can be reduced.

When, however, such first and second stoke switches 4 and 8 as described above are extracted and inserted to be left-right exchanged, for example, a function mark 7a, formed on an indicating member 7 of the first stoke switch 4 for indicating a wiper operation, is turned upside down, and it becomes difficult to recognize the function mark 7a.

Figure 2:
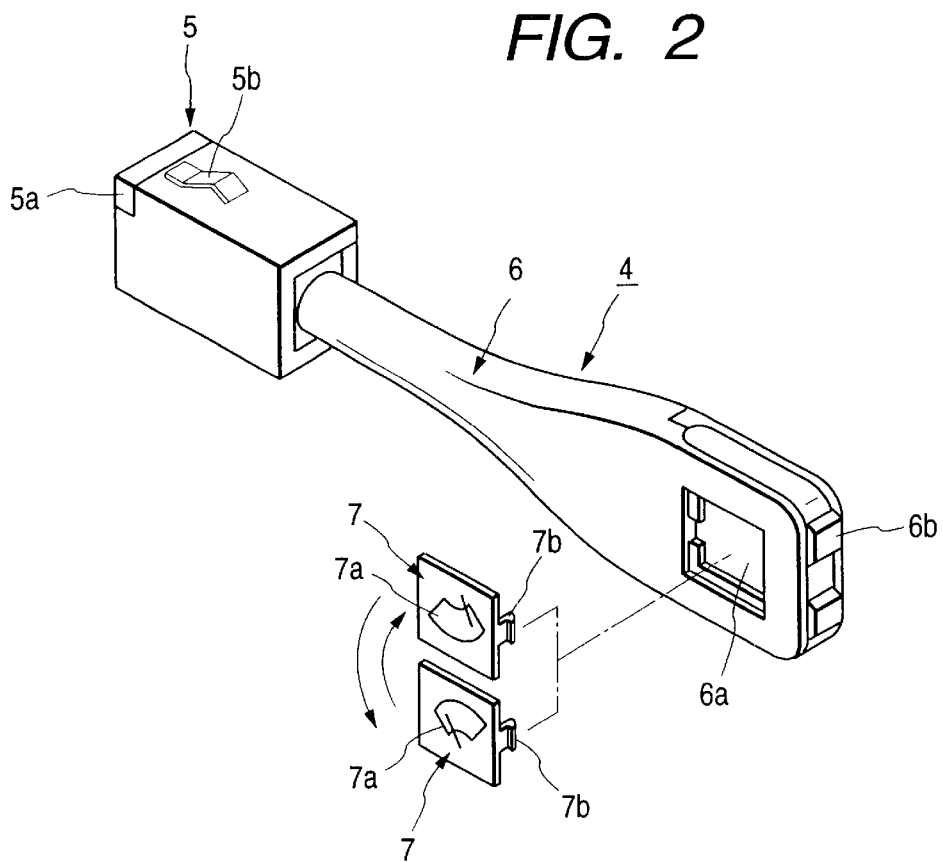
FIG. 2 is a perspective view showing a stoke switch according to the present invention.

As a measure against it, according to the present invention, an indicating member 7 formed like a flat plate having a rectangular external shape is detachably mounted to a rectangular hole-shaped mounting unit 6a formed in the first stoke switch 4 as shown in FIG. 2.

Thus, on the lateral sides of the indicating member 7, there are projectingly formed a pair of snap legs 7b in such a manner that the indicating member 7 can be mounted to the mounting unit 6a by snap engagement.

When the stoke switch 4 is extracted from and inserted into the steering column 1 for left-right exchanging, the indicating member 7 with the function mark 7a turned upside down is adapted to be extracted to correct the direction thereof.

Figure 3:
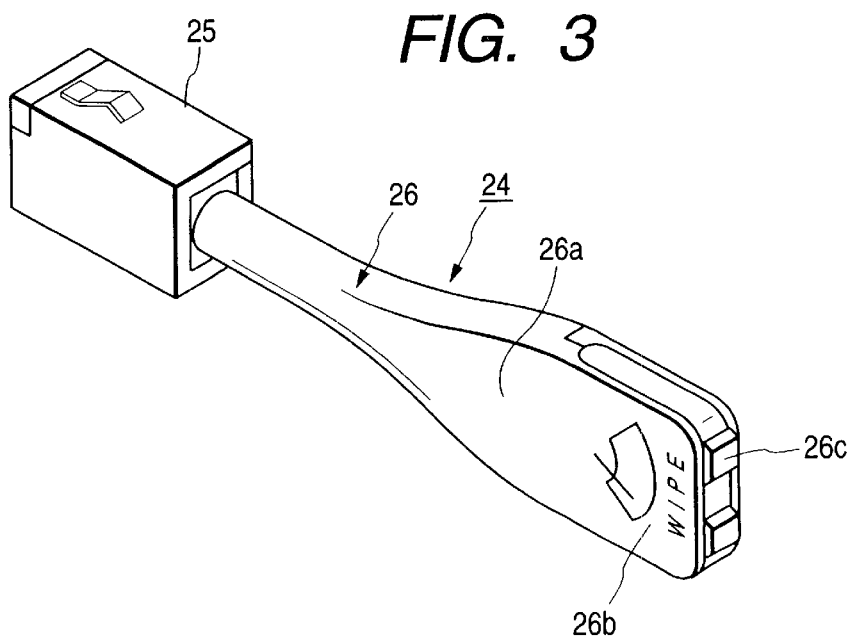
FIG. 3 is a perspective view showing a stoke switch according to the present invention.

As another method of recognizing the function mark 7a when the first and second stoke switches 4 and 8 are left-right exchanged, there may be used the structure in which as shown in FIG. 3, a first stoke switch 24 is mounted to a proximal portion 25 in such a manner that the center line 26a of an operating lever 26 mounted to extend from the proximal portion 25 in the extending direction becomes substantially horizontal, the operating lever 26a is formed with a function mark 26a for indicating the type of the first stoke switch 24, and the function mark 26a is formed to incline the direction thereof in the center line 26a direction of the operating lever 26. In FIG. 3, reference numeral 26c denotes an operation switch.

Figure 4:
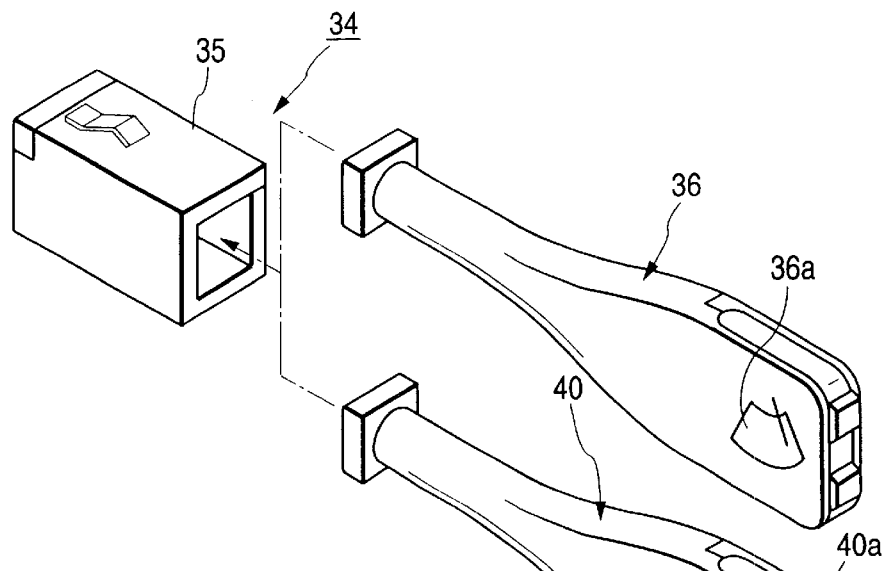
FIG. 4 is a perspective view showing a stoke switch according to the present invention.

Also, as another method, there may be used the structure in which for a first stoke switch 34 shown in FIG. 4, there are prepared two types for each of operating levers having the same function: a left-hand operating lever 36 and a right-hand operating lever 40, and when the stoke switch 34 is exchanged from right to left, the right-hand operating lever 40 is replaced with the left-hand operating lever 36 correspondingly to the direction of mounting the stoke switch 34.

Figure 5:
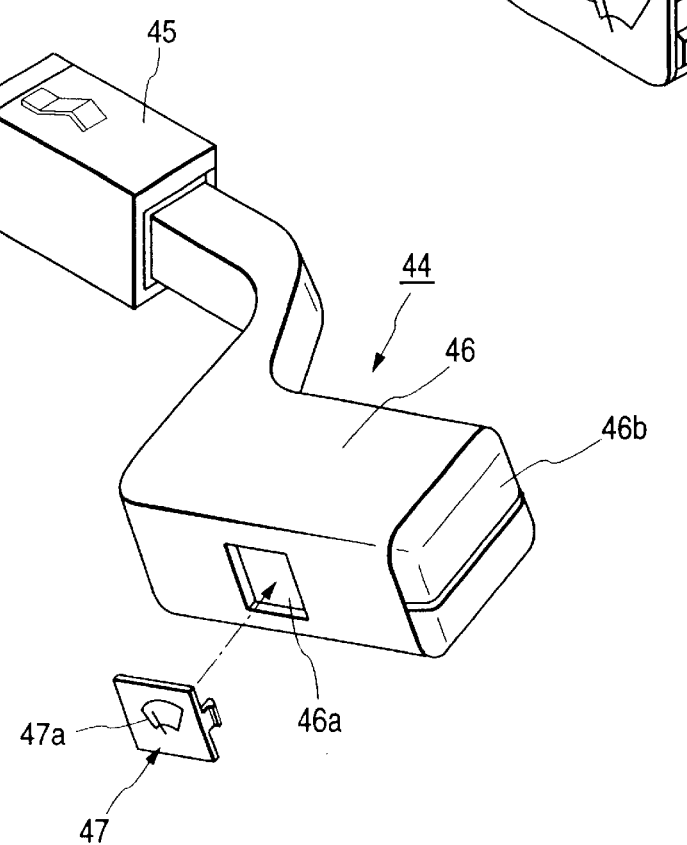
FIG. 5 is a perspective view showing a stoke switch according to the present invention.

As regards such operating levers 6 and 10 for the first and second steering wheel column lever type switches 4 and 8 as described above, a description has been made of those linearly extending from the proximal portions 5 and 9, but a first steering wheel column lever type switch 44 may be one with its operating lever 46 bent in an irregular shape as shown in FIG. 5. The operating lever 46 is formed with a mounting unit 46a, which is detachably mounted with an indicating member 47 having a function mark 47a. In FIG. 5, reference numeral 46a denotes an operation switch.

Therefore, as regards a request for changing a mounting angle of the stoke switch with respect to the steering column 1, the mounting angle of the stoke switch 45 with respect to the steering column 1 can be arbitrarily changed without changing the exclusively-used stoke switch or the mounting member 3 within the steering column 1 depending upon the type of an automobile.

In the first embodiment according to the present invention, the description has been made of the stoke switch only on the first stoke switch side, but since the second stoke switch side has also the same structure, a description thereof is omitted.

A description will be made of a second embodiment in which the first and second stoke switches 4 and 8 are discriminated when such first and second stoke switches 4 and 8 mounted on the lateral sides of the steering column 1 to enable them to be extracted and inserted as shown in FIG. 1 are left-right exchanged. Within the first and second stoke switches 4 and 8, discrimination codes (not shown) consisting of fixed resistors having different resistances respectively are mounted.

On the steering column 1 side, there is provided discrimination means capable of discriminating the discrimination codes, and this discrimination means is provided with an arithmetic processing unit (not shown) such as CPU and a reference resistor (not shown) consisting of a predetermined resistance.

As another method, there may be also used the structure in which when the stoke switches 4 and 8 are extracted from and inserted into the steering column 1 for left-right exchanging, the arithmetic processing unit on the steering column 1 side detects ratios of the resistance value of the reference resistor to the resistances of the fixed resistors in the first and second stoke switches 4 and 8 to discriminate the first and second stoke switches 4 and 8 respectively, and their functions are caused to be performed respectively.

Also, the discrimination means consisting of the fixed resistor is capable of discriminating not only two stoke switches (first and second) 4 and 8, but also a plurality of stoke switches having any other functions, by mounting a fixed resistor having a different resistance from these two stoke switches 4 and 8. In addition, in the above-described embodiments, the description has been made of the case where the left and right stoke switches are exchanged, but the present invention is not limited thereto, but in the case of, for example, a left-side stoke switch of a Japanese vehicle, although its function is usually a wiper operation (F/R wiper), the left-side stoke switch can be caused to have a different function (such as F wiper) by changing the fixed resistor and indicating member which provide the discrimination codes in the same shape.

Effect of the Invention

The structure for mounting stoke switches according to the present invention is such that a plurality of stoke switches having different functions mounted to the steering column on both sides to enable them to be extracted and inserted have different discrimination codes respectively, and the steering column has discrimination means capable of discriminating the discrimination codes in such a manner that this discrimination means discriminates between the discrimination codes of the stoke switches to be mounted to the steering column. Therefore, even if a plurality of stoke switches having different functions are exchanged respectively to be mounted to the steering column, there can be provided the structure for mounting stoke switches capable of easily discriminating between stoke switches having different functions by means of the discrimination codes and the discrimination means.

Also, the plurality of stoke switches have the discrimination codes consisting of fixed resistors having different resistances respectively, the discrimination means includes an arithmetic processing unit provided on the steering column side and a reference resistor consisting of a predetermined resistance, and when the stoke switches are extracted from and inserted into the steering column for exchanging, the arithmetic processing unit detects a ratio of the resistance of the reference resistor to the resistance of the fixed resistor of each of the stoke switches to cause the functions of the stoke switches to be performed respectively. Therefore, it is possible to easily discriminate between the plurality of stoke switches having different functions by means of low-cost components such as fixed resistors.

Also, each of the stoke switches has a mounting unit for detachably mounting, in the operating lever, an indicating member, on which a function mark for indicating the function of the stoke switch has been formed, and when the stoke switches are extracted from and inserted into the steering column for exchanging, it has been made possible to correct the direction of the function mark by attaching and detaching the indicating member. Therefore, even if stoke switches having the same function are left-right exchanged respectively between a right-steering wheel vehicle and a left-steering wheel vehicle, the function marks can be recognized only by correcting the direction of the function mark by extracting and inserting the indicating members, and the variety of the stoke switch can be reduced.

Also, the indicating member has been arranged to be mounted to the mounting unit of the operating lever by snap engagement, and therefore, the indicating member can be easily attached and detached with a single motion, and the assembly efficiency is excellent.

Also, the stoke switch is such that the operating lever is mounted to the proximal portion in such a manner that the center line of the operating lever in the extending direction from the proximal portion becomes substantially horizontal, the operating lever has a function mark for indicating the function of the stoke switch, and the function mark is formed so as to incline the direction thereof in the center line direction of the operating lever. Therefore, even if stoke switches having the same function are left-right exchanged respectively, it is possible to recognize the function marks, and the variety of the stoke switch can be reduced.

The stoke switch is such that the operating lever is detachably mounted to the proximal portion, the operating lever has a function mark for indicating the function of the stoke switch, there are provided two types (right-hand and left-hand) for each of the operating levers having the same function, and when the stoke switches are left-right exchanged and are mounted to the lateral sides of the steering column, any appropriate ones of the operating levers are arranged to be exchanged correspondingly to the respective mounting directions of the stoke switches. Therefore, it is possible to provide structure for mounting stoke switches, having excellent assembly property, capable of recognizing the function mark only by exchanging the right-hand and left-hand operating levers when the stoke switches are left-right exchanged.

Also, since the stoke switch has the operating lever formed by bending it in an irregular shape, the mounting angle of the stoke switch with respect to the steering column can be arbitrarily changed depending upon the type of a vehicle.

Also, since the steering column has a mounting member capable of snap-engaging with the proximal portion of the stoke switch within and the proximal portion of the stoke switch is arranged to be mounted to the mounting member by snap engagement, assembly time when the stoke switch is mounted to the steering column can be shortened.

Also, the first and second stoke switches, mounted on the lateral sides of the steering column to enable them to be extracted and inserted, having a switching circuit within respectively are provided with a connector unit respectively, each of these connector units is made connectable to connector units provided on the lateral sides of the steering column respectively, the connector unit of the first stoke switch has a first connecting unit, and the connector unit of the second stoke switch has a second connecting unit in such a manner that when the first and second stoke switches are extracted from and inserted into the steering column, the first and second connecting units are connected to the connector units on the steering column side respectively and discrimination between the first and second stoke switches is arranged to be performed. Therefore, it is possible to left-right exchange the first and second stoke switches between a right-steering wheel vehicle and a left-steering wheel vehicle for mounting, and to reduce the variety of the stoke switch. For this reason, it becomes easier to control the stoke switches, and the expenses for inventory control and the like can be reduced.

Also, the connector units on the lateral sides of the steering column have first and second conduction units, to which the first and second connecting units are capable of being connected respectively, in such a manner that when the first and second stoke switches are inserted into the lateral sides of the steering column respectively, the first connecting unit of the first stoke switch is connected to the first conduction unit in the steering column, and the second connecting unit of the second stoke switch is connected to the second conduction unit respectively, and that discrimination between the first and second stoke switches can be performed. Therefore, it is possible to discriminate between the stoke switches left-right exchanged with low-cost components such as connectors, and to manufacture the structure for mounting stoke switches at low cost.

What is claimed is:

1. A structure for mounting stoke switches comprising:

a steering column, and first and second stoke switches mounted to the steering column on lateral sides thereof to enable the first and second stoke switches to be extracted and inserted, the first and second stoke switches having a switching circuit within respectively, each of the stoke switches having a proximal portion mountable to the steering column by extraction and insertion, and an operating lever extending from the proximal portion, each of the stoke switches being provided with a connector unit, connectable to each of connector units provided on the lateral sides of the steering column, the connector unit of the first stoke switch having a first connecting unit, and the connector unit of the second stoke switch having a second connecting unit, such that when the first and second stoke switches are extracted from and inserted into the steering column, the first and second connecting units are connected to the connector units on the lateral sides of the steering column respectively and discrimination between the first and second stoke switches is performed, wherein the connector units on the lateral sides of the steering column have first and second conduction units to which the first and second connecting units can be respectively connected and the discrimination is performed when the first and second stoke switches are inserted into the lateral sides of the steering column and the first connecting unit of the first stoke switch is connected to the first conduction unit of the steering column while the second connecting unit of the second stoke switch is connected to the second conduction unit, and wherein the first and second stoke switches are interchangeable between the lateral sides of the steering column being identically discriminated and controlling the same function independent of the lateral side of the steering column on which the first and second stoke switches are mounted.

2. A structure for mounting stoke switches according to claim 1, wherein each of the stoke switches has a mounting unit, on which an indicating member is mounted, the indicating member having a function mark to indicate a function of the stoke switch formed thereon, the indicating member attachable to and detachable from the operating lever such that when the stoke switches are exchanged in the steering column, a direction of the function mark on the respective indicating member is correctable.

3. A structure for mounting stoke switches according to claim 2, wherein the indicating member is mounted to the mounting unit of the operating lever by snap engagement in accordance with the function of the stoke switch.

4. A structure for mounting stoke switches according to claim 1, wherein each of the stoke switches is mounted to the proximal portion such that a center line of the operating lever in an extending direction from the proximal portion is substantially horizontal, wherein the operating lever has a function mark to indicate a function of the stoke switch, and wherein the function mark is formed with a direction thereof inclined in the center line direction of the operating lever.

5. A structure for mounting stoke switches according to claim 1, wherein each operating lever is detachably mounted to the respective proximal portion and has a function mark to indicate a function of the stoke switch, each operating lever being one of two types (right-hand and left-hand) of operating levers having the same function, the type of the operating lever corresponding to the respective mounting direction of the stoke switch.

6. A structure for mounting stoke switches according to claim 1, wherein the operating lever has an irregular, bent shape.

7. A structure for mounting stoke switches according to claim 1, wherein the steering column has a mounting member snap-engageable with the proximal portion of the stoke switch within, and the proximal portion of the stoke switch is mounted to the mounting member by snap engagement.

* * * * *